(12) United States Patent
Fahldieck (10) Patent No.: US 9,517,898 B2
(45) Date of Patent: Dec. 13, 2016

(54) PIVOT LOCK FOR A BOTTLE GRIPPER

(71) Applicant: KHS GmbH, Dortmund (DE)

(72) Inventor: Andreas Fahldieck, Idar-Oberstein (DE)

(73) Assignee: KHS GmbH, Dortmund (DE)

( * ) Notice: Subject to any disclaimer, the term of this patent is extended or adjusted under 35 U.S.C. 154(b) by 2 days.

(21) Appl. No.: 14/649,252

(22) PCT Filed: Nov. 28, 2013

(86) PCT No.: PCT/EP2013/003606
§ 371 (c)(1),
(2) Date: Jun. 3, 2015

(87) PCT Pub. No.: WO2014/086469
PCT Pub. Date: Jun. 12, 2014

(65) Prior Publication Data
US 2015/0321858 A1  Nov. 12, 2015

(30) Foreign Application Priority Data

Dec. 4, 2012  (DE) .................. 10 2012 111 754

(51) Int. Cl.
*B65G 47/86* (2006.01)
*B65G 47/90* (2006.01)

(52) U.S. Cl.
CPC .......... *B65G 47/847* (2013.01); *B65G 47/90* (2013.01); *B65G 47/908* (2013.01); *B65G 2201/0244* (2013.01)

(58) Field of Classification Search
USPC ............. 294/201, 102, 203, 110.1, 116, 198; 198/803.3, 803.7, 803.9, 803.11
See application file for complete search history.

(56) References Cited

U.S. PATENT DOCUMENTS

| 4,299,532 | A  | * | 11/1981 | Bouwmeester | ...... B65G 47/847 |
|---|---|---|---|---|---|
|  |  |  |  |  | 294/116 |
| 5,743,377 | A  |  | 4/1998 | Kronseder |  |
| 8,925,710 | B2 | * | 1/2015 | Borgatti | ............... B65G 47/847 |
|  |  |  |  |  | 198/803.9 |
| 2002/0167185 | A1 | * | 11/2002 | Graffin | ................... B65G 29/00 |
|  |  |  |  |  | 294/104 |
| 2011/0064555 | A1 | * | 3/2011 | Stoiber | ................ B65G 47/847 |
|  |  |  |  |  | 294/86.4 |
| 2011/0089003 | A1 | * | 4/2011 | Fahldieck | .............. B65G 29/00 |
|  |  |  |  |  | 198/803.1 |
| 2011/0203906 | A1 | * | 8/2011 | Fahldieck | ............... B67C 3/242 |
|  |  |  |  |  | 294/106 |

(Continued)

FOREIGN PATENT DOCUMENTS

DE        297 13 510        8/1998
DE        29413510        * 10/1998
(Continued)

*Primary Examiner* — Paul T Chin
(74) *Attorney, Agent, or Firm* — Occhiuti & Rohlicek LLP (57) ABSTRACT

In one aspect, the invention features an apparatus for use in a container-treatment plant. Such an apparatus includes a gripping-and-holding device having a support body, spring-loaded and pivotable gripper arms on the support body, a locking element, and a horizontal pivot axis about which the locking element pivots between locked and release positions. Pivoting into the release position releases the gripper arms.

9 Claims, 7 Drawing Sheets

(56) References Cited

U.S. PATENT DOCUMENTS

| | | | | |
|---|---|---|---|---|
| 2011/0308666 A1* | 12/2011 | Bodtlander | ............ | B67C 3/242 |
| | | | | 141/165 |
| 2012/0056062 A1* | 3/2012 | Fahldieck | ............ | B65G 47/847 |
| | | | | 248/309.4 |
| 2012/0241407 A1* | 9/2012 | Fahldieck | ............ | B65G 47/847 |
| | | | | 215/386 |
| 2015/0336699 A1* | 11/2015 | Fahldieck | ............... | B65B 43/46 |
| | | | | 198/803.7 |

FOREIGN PATENT DOCUMENTS

| | | | |
|---|---|---|---|
| DE | 10 2010 009364 | | 8/2011 |
| EP | 2 279 143 | | 2/2011 |

* cited by examiner

PIVOT LOCK FOR A BOTTLE GRIPPER

RELATED APPLICATIONS

This application is the national stage under 35 USC 371, of PCT/EP2013/003606, filed on Nov. 28, 2013, which claims the benefit of the Dec. 4, 2012 priority date of German application DE102012111754.3, the contents of which are herein incorporated by reference.

FIELD OF INVENTION

The invention relates to container processing, and in particular, to gripping and holding containers.

BACKGROUND

Container treatment plants often include filling machines, labeling machines, inspection machines or rinsers. The containers are usually bottles for liquids, such as drinks. The bottles can be made of a transparent or translucent material, for example, glass or a translucent plastic, such as PET. It is also feasible for the containers to be made of other materials and filled with other contents.

Bottles must sometimes be securely gripped. In one example, a gripping-and-holding device on a rotor has pivotably mounted gripper arms on a support plate. A spring located opposite the gripper cheeks forces these gripper arms into closed position. Slanted inlets on the front sides of the gripper arms permit bottles to be pushed in or pulled out by compressing the spring.

Another known gripping-and-holding device has a securing element between bearing ends of gripper arms. Each bearing end has an edge recess. Twisting the gripper arms into an extreme open position and carrying out a prior tension-release of the spring releases the gripper arms. This enables them to be removed easily and without tools. The support body has deformable mounting tabs made of an elastic material. These effect a clamping position on securing elements of the transport element. The securing elements have flat-plate heads or washers that prevent the deformable mounting tabs from falling out.

A traction spring that has been secured on securing elements on the gripper arms provides the closing force of the gripper arms. Pressing a bottle into the holder of the gripper arms opens the arms and causes the traction spring to develop a closing force. Sometimes, the spring is not strong enough and gripper arms come loose from their closed position. This can result in losing the bottle that was being held by the gripper arms. This disrupts plant operation.

SUMMARY

The invention provides a device for gripping and holding containers that ensures safe transport of the container along an entire transport path by simple means.

In one aspect, the invention features an apparatus for use in a container-treatment plant. Such an apparatus includes a gripping-and-holding device having a support body, spring-loaded and pivotable gripper arms on the support body, a locking element, and a horizontal pivot axis about which the locking element pivots between locked and release positions. Pivoting into the release position releases the gripper arms.

In some embodiments, the locking element includes a locking side and an actuation side arranged opposite each other relative to the pivot axis.

Embodiments include those in which the locking element includes a claw-like open gripper element, and those in which it includes a U-shaped open gripper element.

In other embodiments, the locking element includes, on a locking side thereof, a gripper element shaped like a sector of a circle. The gripper element defines a semi-circular opening oriented in a direction along the gripper arms.

Another embodiment includes lateral connection bars that connect a gripper element to the pivot axis. In this embodiment, the gripper element is on a locking side of the locking element.

Yet another embodiment includes a lever arm. On a locking side of the locking element is an actuation element. The lever arm connects the actuation element to the pivot axis.

Another embodiment has an energy store arranged underneath the gripper arms, and a counter-bearing. On an actuation side thereof, the locking element includes a holding element having first and second ends. The first end connects to the energy store. The second end connects to the counter-bearing.

Another embodiment includes a transport element with a recess that enables the locking element to pivot unimpeded on an actuation side thereof.

In another aspect, the invention features a locking element arranged on a support body. The locking element is pivotable about a pivot axis between a locked position that locks the gripper arms and a release position that releases the gripper arms.

In some embodiments, the locking element comprises the pivot axis, which is arranged on the support body. In a preferred embodiment, the locking element has a locking side and an actuation side. These sides are arranged opposite each other relative to the pivot axis.

In other embodiments, a claw-like gripper element on the locking side of the locking element grips the gripper arms in the locked position in such a way that the gripper arms are prevented from moving against the spring force, thus locking the gripper arms on both sides by lying on the gripper arms from the outside.

In other embodiments, the gripper element is shaped like a sector of a circle. Among these are semi-circular and U-shaped gripper elements in which the opening of the gripper element is oriented in the direction of the gripper arms.

In other embodiments, connection bars laterally connect the gripper element to the pivot axis.

The internal surfaces of the gripper arms serve as contact surfaces. These are ideally slightly tapered relative to a vertical plane. Alternatively, a free end of the locking element tapers slightly relative to the vertical plane. This configuration facilitates accommodation of different opening widths of the gripper arms for holding containers having different neck widths, and promotes achievement of a secure grip.

Other embodiments feature an actuation element on the actuation side of the locking element. Examples of actuation elements include a roller connected to the pivot axis by a lever arm. The roller is mounted on an axis of rotation such that it can roll down. The axis of rotation connects directly to the lever arm.

Other embodiments feature a holding element arranged on the lever arm on the actuation side, with an energy store is suspended from the holding element. A suitable energy store is a coil spring. The energy store extends from the holding element in the direction of a counter-bearing. The holding element secures one end of the energy store. The counter-bearing secures the other.

In a preferred embodiment, the counter-bearing is connected to the support body and can be made as a securing element having, on its top end, a corresponding holder for the energy store. The energy store extends underneath the gripper arms but above the gripper element through its opening.

In the locked position, the gripper element grips the two gripper arms. In particular, the gripper element lies laterally against the securing elements. This prevents opening of the gripper arms along the transport path as long as the gripper element remains in the locked position.

A particular advantage of the foregoing configuration is that the energy store causes the gripper element to remain in the locked position even when subjected to disturbing forces that arise from, for example, vibrations.

It is advantageous to provide counter-actuation elements corresponding to the actuation elements. These counter-actuation elements are arranged in an unmovable manner on the container treatment plant.

One example of a counter-actuation element is a control cam. In this case, the actuation element of the support body moves along the control cam. The control cam raises the actuation element about the pivot axis, thus lowering the locking side, and hence, the claw-like gripper element. This releases the gripper arms. Once the locking element is in the release position, it becomes possible to insert or remove containers from the gripping and holding device.

The gripping-and-holding device described herein has a simple and inexpensive design. Its open construction and its small number of components make the gripping-and-holding device simple to clean. Because only a short control cam is needed to maintain release position of the locking element for the duration of the insertion and removal of the containers in and out of the gripper arms, only a lower control cost is needed. In addition, this configuration reduces wear and noise. During the majority of the transport path, the locking element is in its locked position and only a slight pre-tensioning of the energy store acts in the locked position.

Some embodiments feature elastic connection bars. This results in a laterally-pliable gripper. Elastic connection bars are particularly advantageous in the locked state.

The disclosed shape forms an effectively self-setting locking element that can adapt to the gripper arms, and that can grip and hold the containers with smaller and larger opening diameters. For example, with a pair of gripper arms, containers within a range of sizes can be transported without changing the set-up of the gripping-and-holding device.

Because the gripper arms are held and supported laterally, they are, in effect, automatically pre-tensioned. This increases the holding force and prevents additional play. In addition, the extent of the pre-tensioning is approximately uniform over the entire possible diameter range. In particular, as the spring force decreases with the path of the locking element, the lever arm exerts a force that becomes larger. Note that this lever arm differs from the physical lever arm between the roller and the pivot axis, necessarily becomes larger. The locking element acts both by the spring force and also by a possible self-retention to reduce the possibility of unwanted opening of the gripper arms.

The illustrated configuration also ensures a central arrangement of the locking element between the gripper arms. This results in more reliable transfer between transport elements.

Additionally, the configurations described herein render any special measures, such as bridging curves, completely optional. This is because the containers are locked in place and pulled out at the time of transfer to another device. Otherwise, the lock would have to be released at the moment of transfer.

An engaging connection connects the support body to the transport element. This enables the support body to be assembled and disassembled easily and without the use of tools. Since the locking element is connected to the support body, the entire assembly can easily be assembled and dismantled. The elements connected to the support body, such as the locking element, can also advantageously be replaced without the use of tools.

The simple and tool-free replacement is advantageous makes prompt remedial action possible in the event of a crash. Any locking element that has been destroyed as a result of having been overloaded can be replaced simply and without tools.

The secure locking action permits filled containers to be held securely, even if they have small neck rings or weakly marked securing rings or grooves. This means that the dimensions of the neck ring can be reduced, since a large neck ring would no longer be needed for secure gripping. As a result, the neck rings can be thinner or narrower, thus saving on materials and reducing costs.

Further developments, benefits and application possibilities of the invention arise also from the following description of examples of embodiments and from the figures. Moreover, all characteristics described and/or illustrated individually or in any combination are categorically the subject of the invention, regardless of their inclusion in the claims or reference to them. The content of the claims is also an integral part of the description.

BRIEF DESCRIPTION OF THE FIGURES

The invention is explained in more detail below by means of the following detailed description and the accompanying figures in which.

In the various figures, the same parts are always given the same reference symbols, and hence they are generally also only described once.

DETAILED DESCRIPTION

Figure 1:
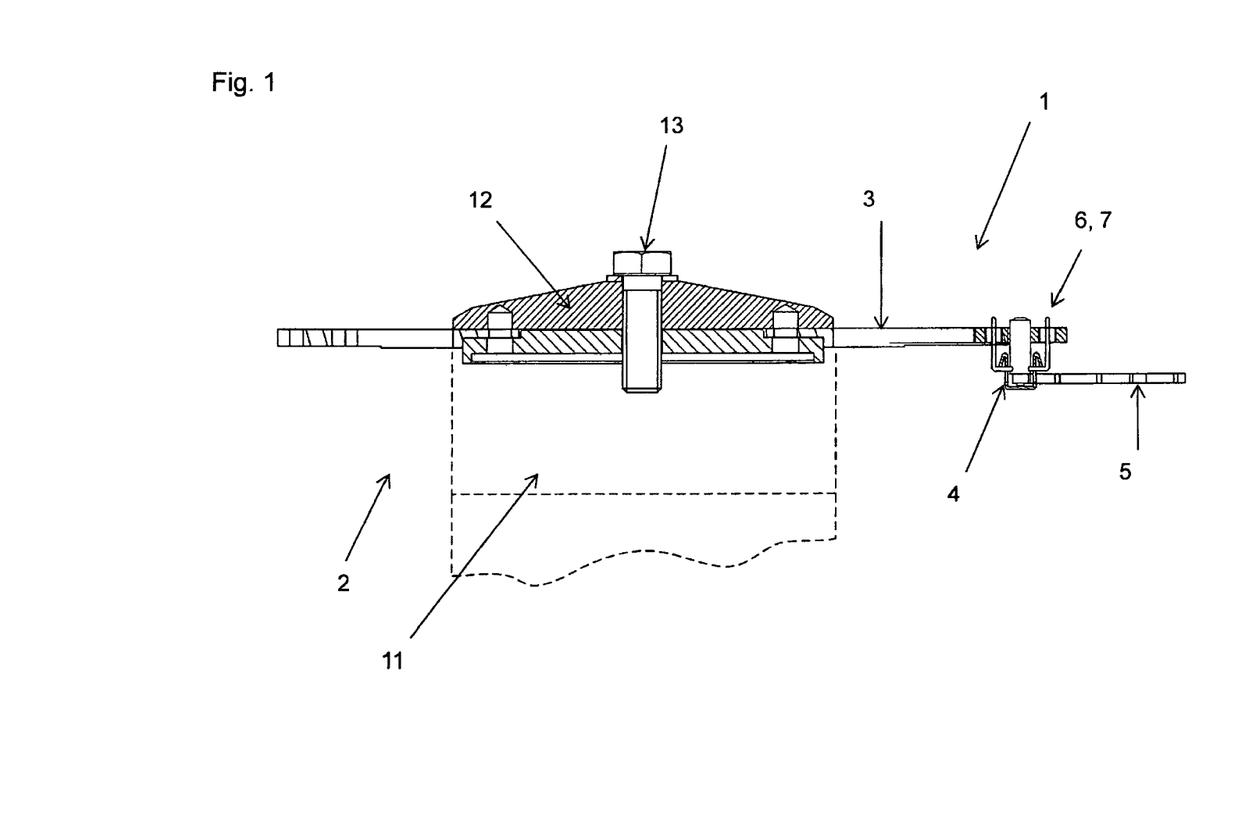
FIG. 1 is a longitudinal section of a gripping-and-holding device that is connected to a transport element.

FIG. 1 shows a device 1 for gripping and holding containers in a container treatment plant 2. The containers can be bottles, and in particular, PET bottles. In some embodiments, the container treatment plant 2 comprises a treatment machine, such as a filling machine.

The device 1 has a support body 4 on which are pivotable spring-loaded gripper arms 5. Engaging elements 6 on the support body 4 engage corresponding counter-engaging elements 7 on a transport element 3. As a result, the support body 4 can be interlocked with the transport element 3.

In one embodiment, an engaging element 6 is a spring bar 6 that has a protrusion 9 on a top section 8 thereof. In this embodiment, a counter-engagement element 7 has a first opening and a second opening that is smaller than the first opening. The first opening is adapted to the protrusions 9 of the top section 8 so that the top section of the spring bar 6 guides the spring bar 6 through the first opening.

In some embodiments, multiple spring bars 6, of which two are shown by way of example, are provided on the support body 4. The spring bars are arranged on either side of a rotary holder that holds pivot pins of the gripper arms 5.

The first opening transitions directly into the narrower second opening. The second opening is adapted to a high bar 10 underneath the top section 8. Once the top section 8 has been guided completely through the first opening, the spring bar 6 snaps into the second opening under spring force. The spring bar 6, however, still retains some pretension after having snapped into the second opening.

The top section 8 projects by its protrusions 9 laterally over the second opening and thus lies on the transport element 3. The result is an engaging connection that securely positions the support body 4 on the transport element 3 in a way that resists the effects of vibration. This type of engaging connection has the further benefit of making it possible to carry out assembly and disassembly without tools.

As shown in FIG. 1, the transport element 3 connects to a shaft 11. In some embodiments, the transport element 3 is implemented as one of many arc elements connected to the shaft 11. A cap element 12 connected to the shaft 11 by a screw 13 holds all of the transport elements 3 in a positionally stable manner, thus effectively forming a star transporter. In other embodiments, the transport element 3 is a circular disk. A cap element 12 connected to the shaft 11 by a screw 13 holds the circular disk in a stable manner. Naturally, other securing options are also feasible.

Figure 2:
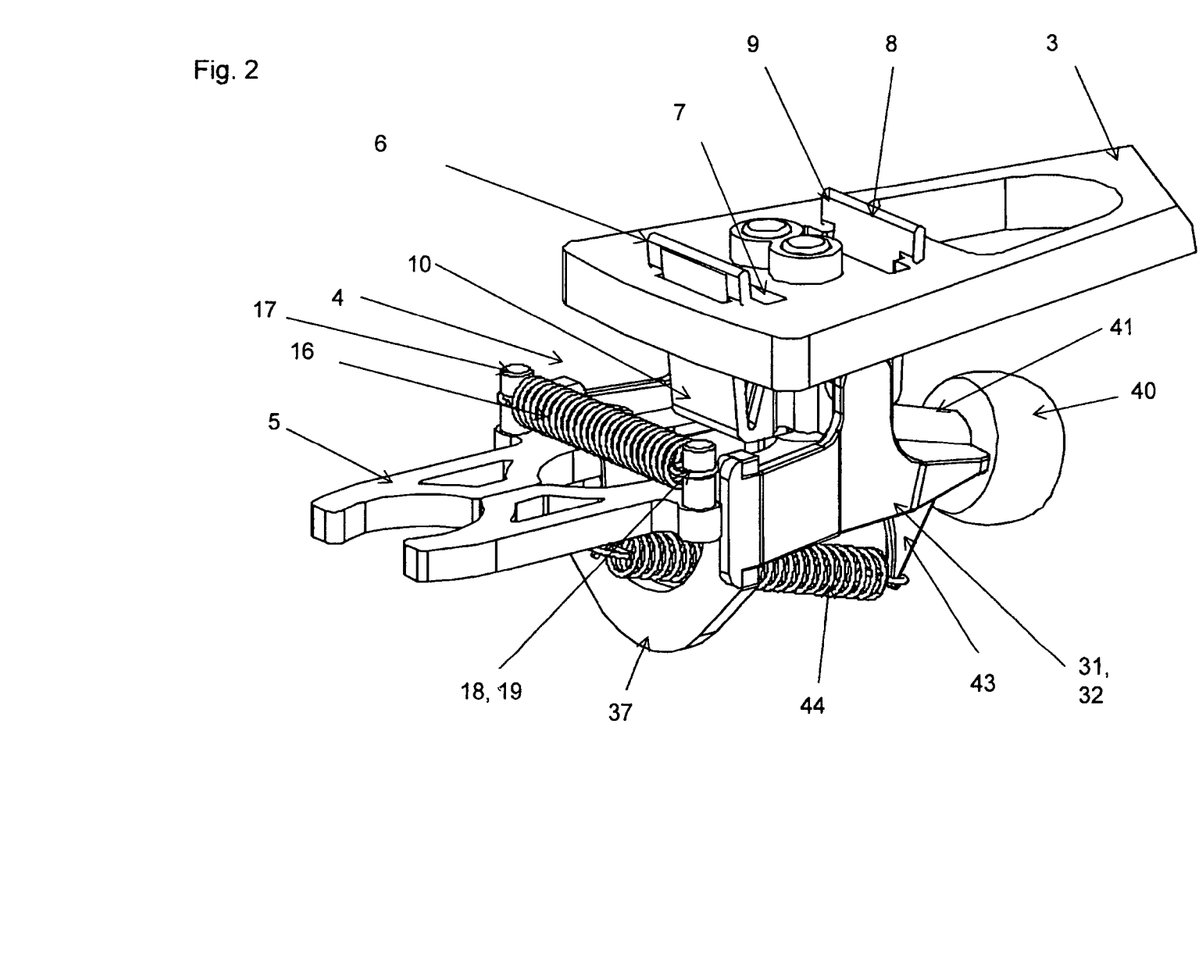
FIG. 2 is a perspective view of the device shown in FIG. 1 with a transport element in a locked position.

FIG. 2 shows a traction spring 16 secured on securing elements 17 on the gripper arms 5 for exerting a closing force on the gripper arms 5. In one embodiment, the securing elements 17 are implemented as securing spigots, each of which comprises a peripheral annular groove 18. The traction spring 16 can thus be suspended from its eyelets 19 without the use of tools.

Figure 3:
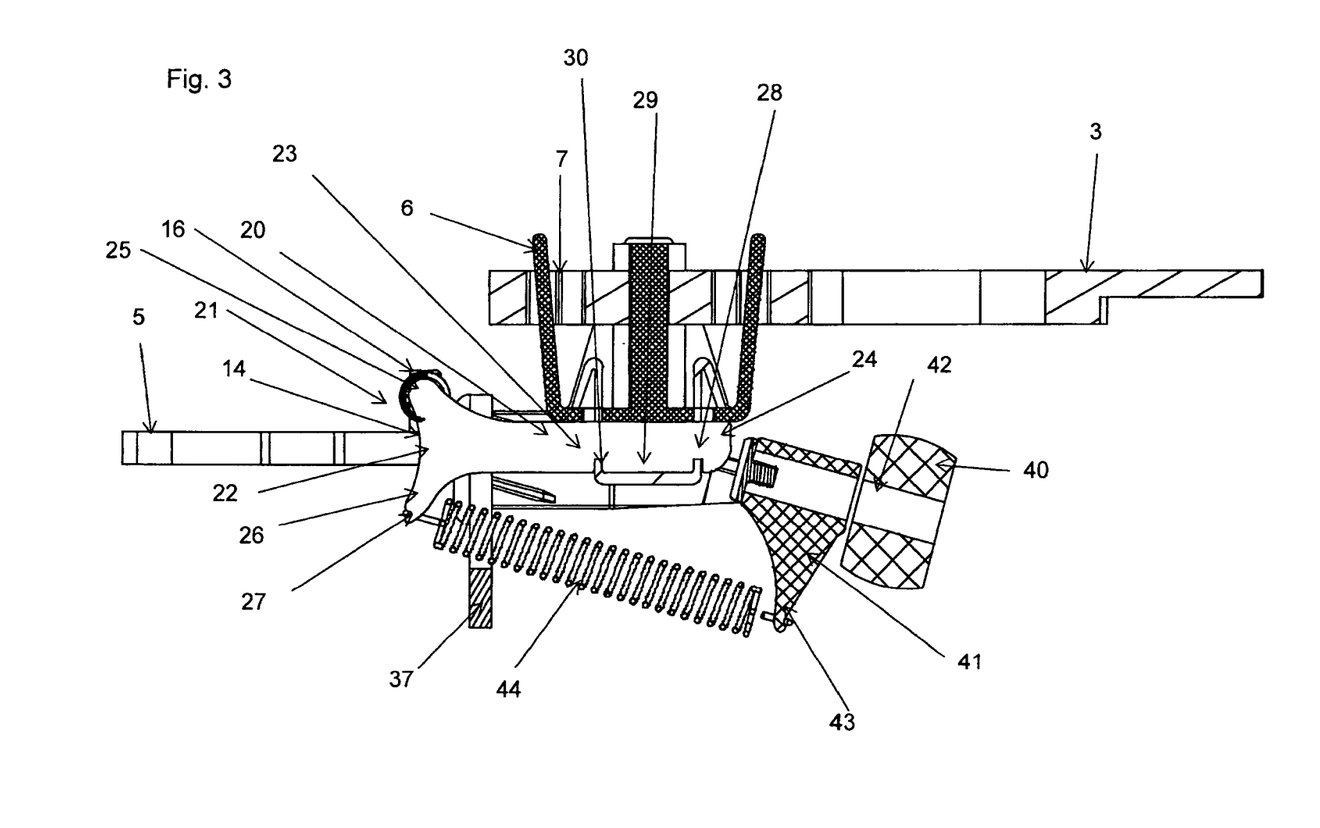
FIG. 3 is a longitudinal section of the device shown in FIG. 2.

FIG. 3 shows a securing element 20 having a securing end 21 that engages the traction spring 16 and another end arranged on the support body 4.

In the embodiment shown in FIG. 3, the securing element 20 is T-shaped with a securing end 21 arranged as a head bar 22 perpendicular to a main bar 23 that is connected to the securing end 21 and that extends through to one end 24 of the securing element 20.

In one example, the head bar 22, with its engaging section 25 engaging the traction spring 16 is rounded, and a receiving section 26 opposite the engaging section 25 on the head bar 22 has a hook-type recess 27. An energy store 44 can be suspended in the recess 27 without the use of tools. In the illustrated embodiment, the energy store 44 is implemented by a spring similar to the traction spring 16, The securing element 20 is fixed with its head bar 22, preferably with the rounded engaging section 25, between two windings of the traction spring 16. In some embodiments, the two windings are at the center of the traction spring 16.

As can further be seen in FIG. 3, the securing element 20 has two insertion grooves 28 on its main bar 23. The insertion grooves 28 are arranged on an underside 29 of the securing element 20 on which the hook-type recess 27 of the head bar 22 is also arranged. In some embodiments, the insertion grooves 28 engage a corresponding engaging bar 30 of the support body 4 in a clamping manner.

Figure 4:
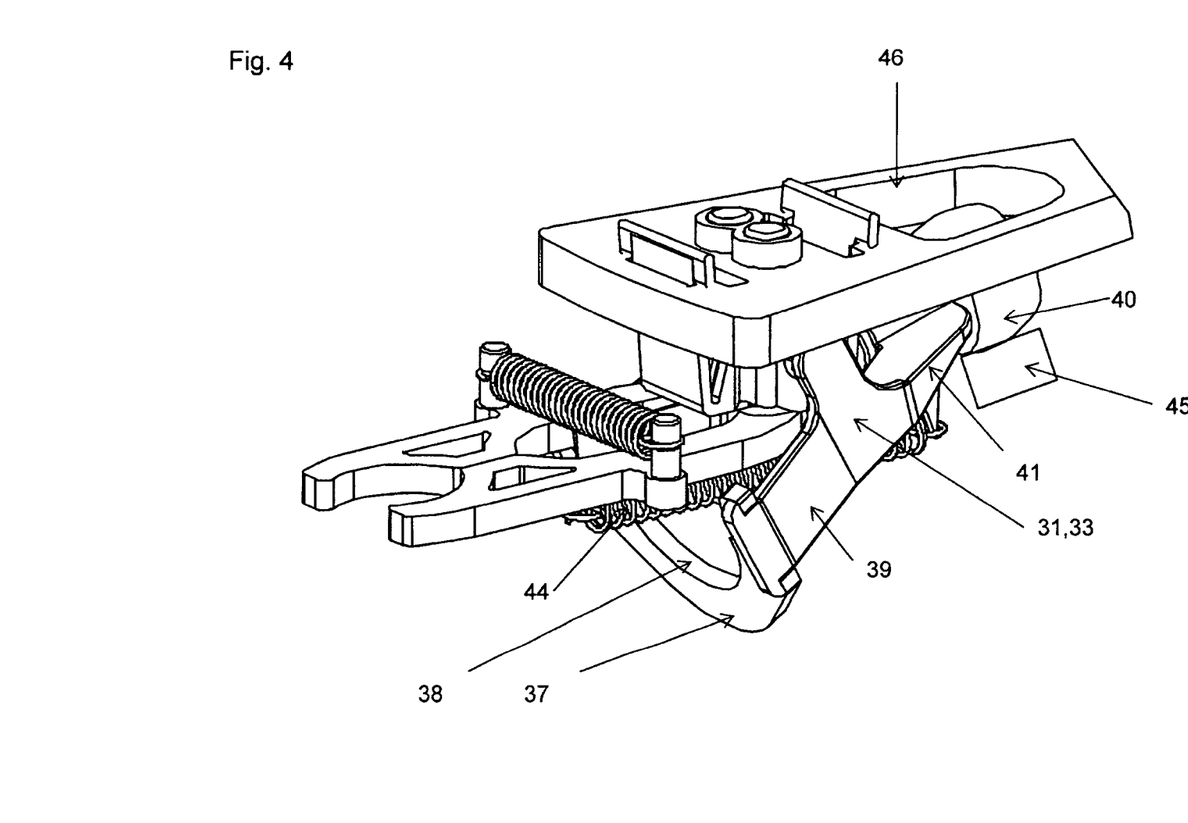
FIG. 4 is a perspective view of the device in FIG. 1 in a released position.
Figure 5:
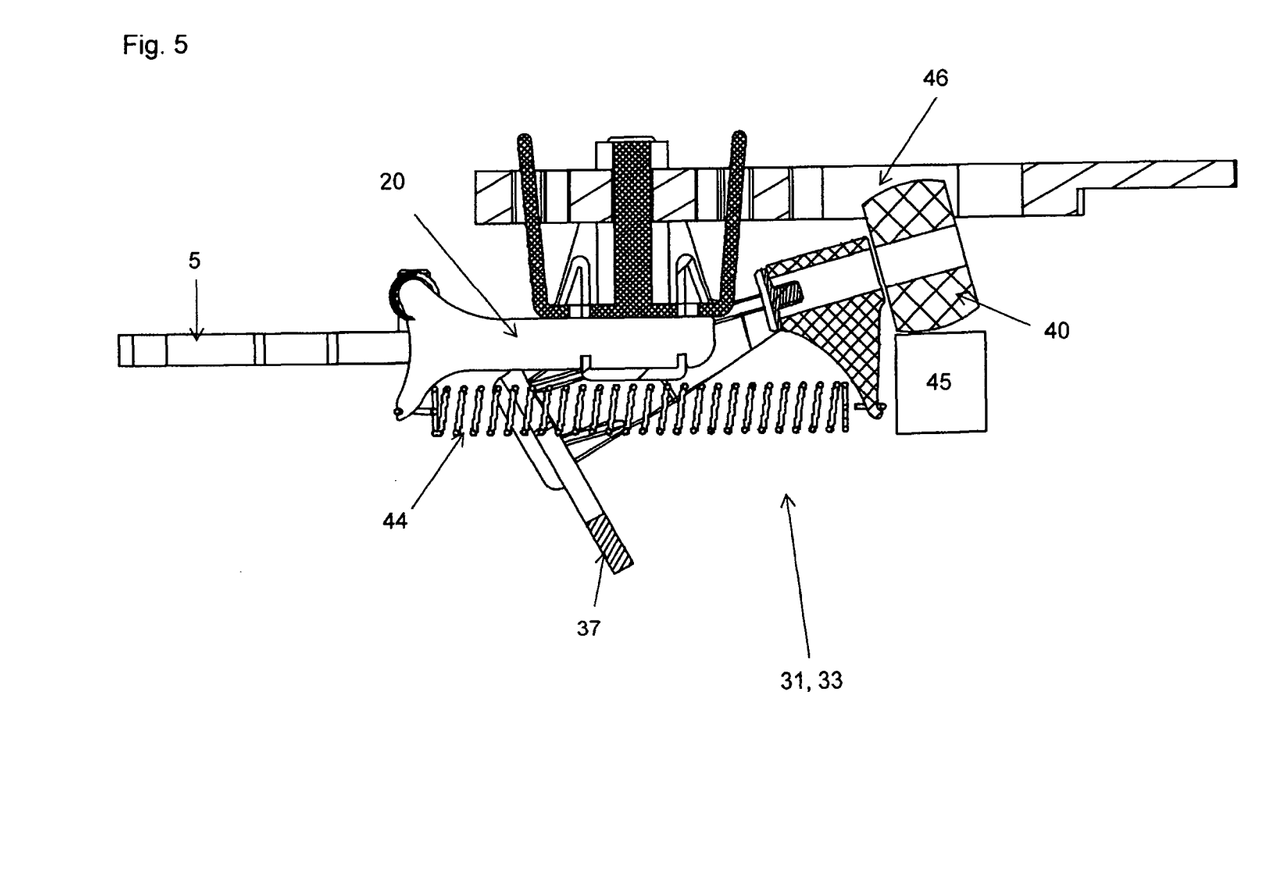
FIG. 5 is a longitudinal section of the device shown in FIG. 4.

As shown in FIGS. 2 to 6, a locking element 31 arranged on the support body 4 pivots about a pivot axis 34 between a locked position 32 and a release position 33. FIGS. 2 and 3 show the locked position 32, in which the gripper arms 5 are locked. FIGS. 4 and 5 show the release position 33, in which the gripper arms 5 are released.

Figure 6:
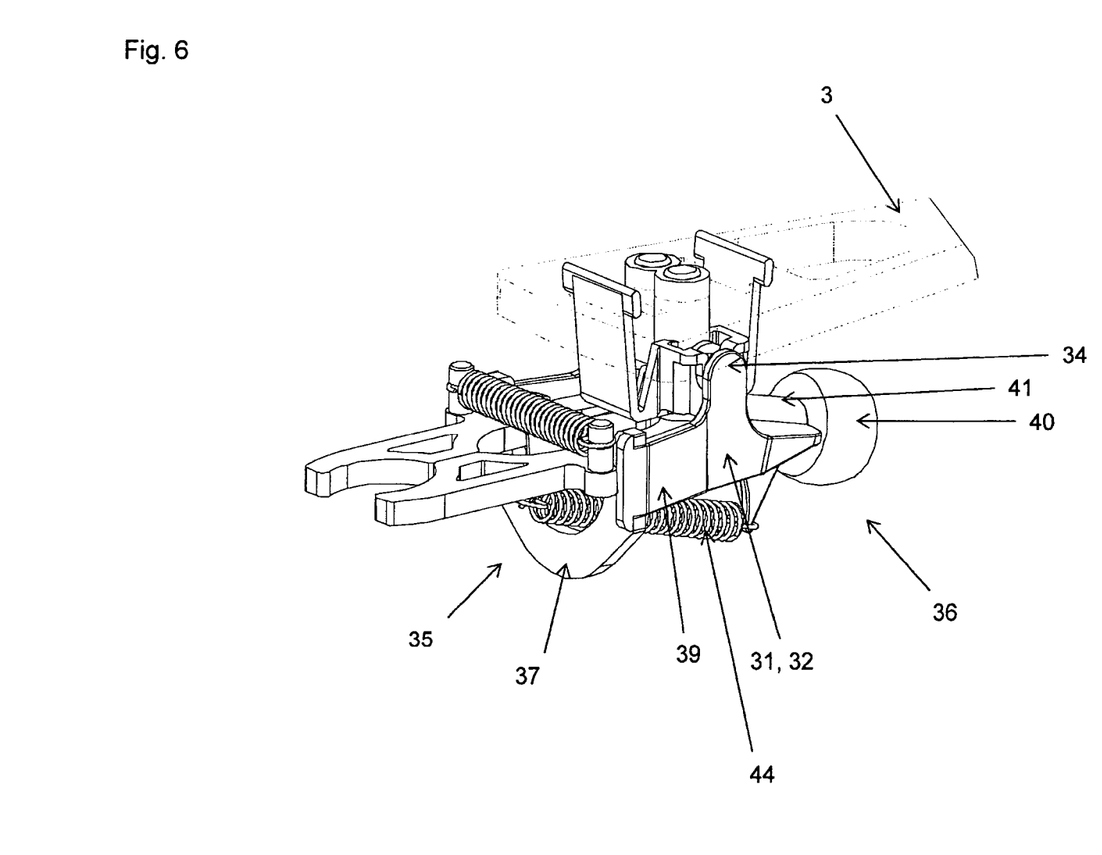
FIG. 6 is a perspective view of the device shown in FIG. 2.

Referring now to FIG. 6, the locking element 31 has a locking side 35 and an actuation side 36 that are arranged on opposite sides of the pivot axis 34. A claw-like gripper element 37 is arranged on the locking side 35 of the locking element 31. The claw-like gripper element 37 grips the gripper arms 5 in the locked position 32. This prevents the gripper arms 5 from moving at least against the spring force of the traction spring 16 and locks the gripper arms 5 on both sides.

In one embodiment, the gripper element 37 is shaped like a sector of a circle. Among these are embodiments are those in which the gripper element 37 is shaped like a semi-circle. In other embodiments, the gripper element is U-shaped, The gripper element 37 is oriented such that a semi-circular or U-shaped opening 38 thereof faces the gripper arms 5.

Connection bars 39 connect the gripper element 37 to the pivot axis 34. The semi-circular or U-shaped gripper element 37 attached rigidly to the connection bars 39. Each connection bar 39 extends along one side of the support body 4. In some embodiments, the connection bars 39 are elastic. In these embodiments, the gripper is laterally pliable even in the locked state. The elasticity permits the gripper element 37 to yield in response to laterally acting forces.

The design of the lock allows containers of different opening diameters be transported while maintaining the pre-tension necessary to hold the gripper arms 5 together exists. The gripper element 37 can be attached onto the connection bars 39 or detached from the connection bars 39. This permits the use of interchangeable gripper elements 37. As a result, it is possible to choose a gripper element 37 made of an appropriate material, such as plastic, or metal, or made of a material with an appropriate hardness and/or chemical resistance. The choice of a gripper element 37 can thus be made based on the particular use and nature of the grippers 5.

The actuation side 36 of the locking element 31 has an actuation element 40. In the illustrated embodiment, the actuation element 40 comprises a roller that is connected to the pivot axis 34 by a lever arm 41. As shown in FIG. 3, the roller is advantageously mounted on an axis of rotation 42 that is connected directly to the lever arm 41. The roller is mounted on the axis of rotation 42 such that it can roll down.

A holding element 43 is arranged on the actuation side 36. Preferably, the holding element 43 is arranged on the lever arm 41. An energy store 44 extends between the holding element 43 and a counter-bearing. A first end of the energy store 44 is attached to the holding element 43 and a second end is attached to the counter-bearing. The energy store 44 is thus suspended between the counter-bearing and the holding element 43, preferably without the use of tools. In one embodiment, the energy store 44 is implemented as a coil spring.

In a preferred embodiment, the counter-bearing is connected to the support body 4. In this embodiment, the counter-bearing comprises a securing element 20 that has, on its top end, a corresponding holder for the energy store 44. A suitable holder would be the recess 27 that is arranged on the holder section 26 of the top bar 22. The energy store 44 extends underneath the gripper arms 5 but above the gripper element 37 through its semi-circular opening 38.

In the locked position 32, the gripper element 37 grips the two gripper arms 5. Preferably, the gripper element 37 lies against the securing elements 17 in a locking manner for the traction spring 16 with each side of the gripper element 37 being disposed beside a corresponding securing element 17. This prevents opening of the gripper arms 5 along the transport path as long as the gripper element 37 remains arranged in the locked position 32.

As can be seen, the energy store 44 urges the gripper element 37 to remain in its locked position 32 even when forces resulting from vibrations or other influences might otherwise cause it to leave its locked position 32. Moreover, no counter-actuation elements are necessary to pivot the locking element 31 out of the locked position 32 into its release position 33.

FIG. 5 shows a counter-actuation element 45 corresponding to the actuation element 40. The counter-actuation element 45 is arranged on the container treatment plant 2. The support body 4, the transport element 4, and the actuation element 40 move relative to the counter-actuation element 45. This means that the counter-actuation element 45 is arranged in an unmovable manner on the container treatment plant 2.

In a preferred embodiment, the counter-actuation element 45 comprises a control cam along which the actuation element 40 moves. To enter the release position 33, the control cam pivots the actuation element 40 about the pivot axis 34. This raises the actuation element 40 and thus lowers the locking side 35, which lowers the gripper element 37 and releases the gripper arms 5. In the release position 33, containers can be inserted into the gripping-and-holding device 1 and removed from it. A recess 46 in the transport element 3 permits the actuation side of the locking element 31 to pivot up unimpeded. This arrangement also makes it easier to clean and assemble the components.

As can be seen in FIGS. 2 to 6, the energy store 44 is tensioned, i.e. pre-tensioned, in the locked position 32 and also in the release position 33. The resulting spring force pivots the locking element 31 from its release position 33 into its locked position 32. Enough pre-tension remains even in the locked position 32 to prevent unwanted pivoting into the release position 33. The remaining pre-tension is selected such that combined action of the actuation element 40 and the counter-actuation element 45 is required to overcome it.

It is particularly advantageous if, as in the example shown, when inserted in the transport element 3 together with the support element 4 by contact of the bearing point/pin of the swivel axis 34, the locking element 31 lies on the surface of the transport element 3 (here its underside) (FIG. 6). Thus, a form-fitting bearing and securing is formed when fitted, wherein a defined position for the bearing points/pins, not shown, of the pivot axis 34 or the theoretical pivot axis is formed. After releasing the locking element 31 from the transport element 3, the form-fit is immediately released, due to the absence of the end stop by the distance from the surface of the transport element. The particular advantage consists of it being possible to fit the support body 4 and the locking element 31 into each other very easily and in particular no closed axis bearing needs to be formed on the support body 4.

Figure 7A:
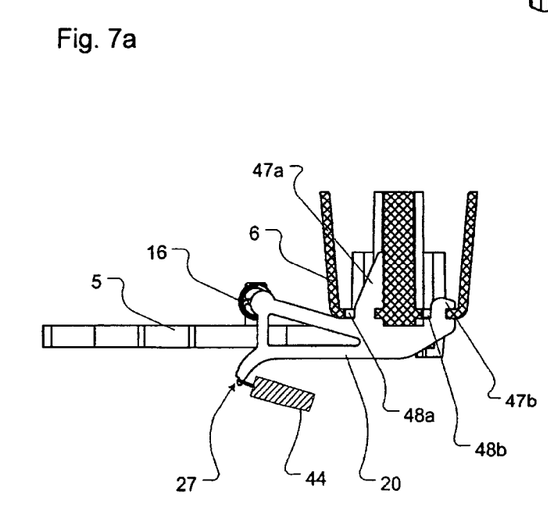
FIGS. 7a and 7b show views of an alternative embodiment.
Figure 7B:
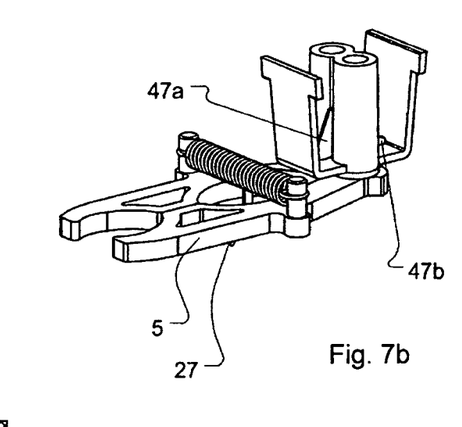

In the alternative embodiment shown in FIGS. 7a and 7b, the securing element 20 has two claw-like engaging sections 47a, 47b that are fed through one or two slot-like notches 48a, 48b of the support body 4 and pushed crosswise to the feed direction in such a way that the claw-type notch of the engaging sections 47a, 47b engage.

It is advantageous for each securing element 20 to be a plate, such as a special steel spring plate. This improves the resetting and centering following a deflection in the circumferential direction. Furthermore, an elastic securing element 20 prevents the traction spring 16 from being pushed on its bracket and falling off in the event of a strong deflection in the circumferential direction.

Having described the invention, and a preferred embodiment thereof, what is claimed as new, and secured by Letters Patent is:

1. An apparatus for use in a container-treatment plant, said apparatus comprising a gripping-and-holding device, said gripping-and-holding device comprising a support body, gripper arms, a locking element, and a pivot axis, wherein said gripper arms are pivotable, wherein said gripper arms are spring loaded, wherein said gripper arms are on said support body, wherein said locking element is on said support body, wherein said locking element pivots about said pivot axis, wherein said pivot axis is horizontal, wherein said locking element has a locked position, wherein said locking element has a release position, wherein said locking element pivots between said locked position and said release position, wherein said locking element pivots about said pivot axis, and wherein, in said release position, said gripper arms are released.

2. The apparatus of claim 1, wherein said locking element comprises a locking side and an actuation side, wherein said locking side and said actuation side are arranged opposite each other relative to said pivot axis.

3. The apparatus of claim 1, wherein said locking element comprises a claw-like gripper element.

4. The apparatus of claim 1, wherein said locking element comprises a U-shaped gripper element.

5. The apparatus of claim 1, wherein said locking element comprises, on a locking side thereof, a gripper element, wherein said gripper element is shaped like a sector of a circle, wherein said gripper element defines a semi-circular opening, wherein said semi-circular opening is faces said gripper arms.

6. The apparatus of claim 1, further comprising lateral connection bars, wherein, on a locking side thereof, said locking element comprises a gripper element, wherein said connection bars connect said gripper element to said pivot axis.

7. The apparatus of claim 1, further comprising a lever arm, wherein, on a locking side thereof, said locking element comprises an actuation element, wherein said lever arm connects said actuation element to said pivot axis.

8. The apparatus of claim 1, further comprising an energy store and a counter-bearing, wherein, on an actuation side thereof, said locking element comprises a holding element having a first end and a second end, wherein said first end connects to said energy store, wherein said second end connects to said counter-bearing, and wherein said energy store is arranged underneath said gripper arms.

9. The apparatus of claim 1, further comprising a transport element, wherein said transport element comprises a recess, wherein said recess enables said locking element to pivot unimpeded on an actuation side thereof.

* * * * *